(12) United States Patent
Furukawa

(10) Patent No.: US 10,077,708 B2
(45) Date of Patent: Sep. 18, 2018

(54) GAS ENGINE AND ASSEMBLING METHOD FOR GAS ENGINE

(71) Applicant: Mitsubishi Heavy Industries, Ltd., Tokyo (JP)

(72) Inventor: Yuta Furukawa, Tokyo (JP)

(73) Assignee: Mitsubishi Heavy Industries Engine & Turbocharger, Ltd., Kanagawa (JP)

( * ) Notice: Subject to any disclaimer, the term of this patent is extended or adjusted under 35 U.S.C. 154(b) by 0 days.

(21) Appl. No.: 15/104,505

(22) PCT Filed: Dec. 2, 2014

(86) PCT No.: PCT/JP2014/081826
§ 371 (c)(1),
(2) Date: Jun. 14, 2016

(87) PCT Pub. No.: WO2015/093279
PCT Pub. Date: Jun. 25, 2015

(65) Prior Publication Data
US 2016/0312685 A1   Oct. 27, 2016

(30) Foreign Application Priority Data
Dec. 16, 2013 (JP) ................................. 2013-259377

(51) Int. Cl.
*F02B 19/16* (2006.01)
*F02B 19/12* (2006.01)
(Continued)

(52) U.S. Cl.
CPC ............ *F02B 19/16* (2013.01); *F02B 19/108* (2013.01); *F02B 19/12* (2013.01); *F02B 43/00* (2013.01);
(Continued)

(58) Field of Classification Search
CPC .... F02B 19/16; F02B 19/108; F02B 19/1004; F02B 19/12; F02F 11/002
(Continued)

(56) References Cited

U.S. PATENT DOCUMENTS 2,292,409 A * 8/1942 Steward .............. F02B 19/1004
                                                    123/169 R
3,117,564 A * 1/1964 May ....................... F02M 53/04
                                                    123/143 R
(Continued)

FOREIGN PATENT DOCUMENTS

DE    2416804 A1   10/1975
EP    2977582 A1   1/2016
(Continued)

OTHER PUBLICATIONS

International Search Report, App. No. PCT/JP2014/081826, dated Mar. 10, 2015, 3 Pages.
(Continued)

*Primary Examiner* — David Hamaoui
*Assistant Examiner* — Kody Kight
(74) *Attorney, Agent, or Firm* — Berkeley Law & Technology Group, LLP

(57) ABSTRACT

A gas engine includes a cylinder head, a prechamber cap that projects into a main combustion chamber by being inserted into an insertion hole formed in the cylinder head, that internally has a prechamber, and that supplies a flame generated in the prechamber to the main combustion chamber, and a prechamber holder that is disposed inside the cylinder head so as to hold the prechamber cap. One of the prechamber cap and the prechamber holder has a concave portion which accommodates an end portion of the other of the prechamber cap and the prechamber holder. An outer diameter of the end portion is set to be smaller than an inner
(Continued)

diameter of the concave portion, thereby forming a space between the concave portion and the end portion at least in a radial direction orthogonal to a central axis.

9 Claims, 7 Drawing Sheets

(51) Int. Cl.
    *F02B 19/10*     (2006.01)
    *F02B 43/00*     (2006.01)
    *F02F 1/24*     (2006.01)
    *F02F 11/00*     (2006.01)
    *F02M 21/02*     (2006.01)

(52) U.S. Cl.
    CPC ............ *F02F 1/242* (2013.01); *F02F 11/002* (2013.01); *F02M 21/0281* (2013.01); *F02M 21/0275* (2013.01); *Y02T 10/125* (2013.01); *Y02T 10/32* (2013.01)

(58) Field of Classification Search
    USPC .......................................................... 123/273
    See application file for complete search history.

(56) References Cited

U.S. PATENT DOCUMENTS

| | | | | |
|---|---|---|---|---|
| 3,556,703 A * | 1/1971 | Florjancic | ............... | B43K 29/16 431/254 |
| 4,029,075 A * | 6/1977 | Noguchi | ............. | F02B 19/1004 123/169 PA |
| 4,224,980 A * | 9/1980 | Buchner | ............. | F02B 19/1004 165/185 |
| 4,426,966 A * | 1/1984 | Huther | ................... | F02B 19/14 123/254 |
| 4,620,516 A * | 11/1986 | Reum | .................. | F02B 19/165 123/252 |
| 4,784,098 A * | 11/1988 | Artman | .................. | F02B 19/12 123/262 |
| 5,662,082 A * | 9/1997 | Black | ................. | F02B 19/1009 123/254 |
| 5,778,849 A * | 7/1998 | Regueiro | ............ | F02B 19/1004 123/254 |
| 5,934,244 A * | 8/1999 | Walenta | .................. | F02B 19/16 123/261 |
| 6,016,785 A * | 1/2000 | Divecha | .............. | F02B 19/1004 123/254 |
| 6,513,483 B2 * | 2/2003 | Riggs | ...................... | F02B 19/12 123/254 |
| 7,270,107 B2 * | 9/2007 | Riggs | .................. | F02B 19/1004 123/260 |
| 9,732,664 B2 * | 8/2017 | Trinkel | ................... | F02B 19/12 |
| 2005/0211217 A1 * | 9/2005 | Boley | .................... | F02B 19/12 123/266 |
| 2007/0236122 A1 * | 10/2007 | Borror | .................... | H01T 13/54 313/118 |
| 2010/0132660 A1 * | 6/2010 | Nerheim | ............. | F02B 19/1014 123/260 |
| 2010/0147259 A1 * | 6/2010 | Kuhnert | .................. | F02P 23/04 123/260 |
| 2011/0146618 A1 * | 6/2011 | LaPointe | ................. | F02B 19/12 123/266 |
| 2011/0308489 A1 | 12/2011 | Herden | | |
| 2013/0139784 A1 * | 6/2013 | Pierz | .................. | F02B 19/1009 123/254 |
| 2014/0261298 A1 * | 9/2014 | Sasidharan | ............. | F02B 19/18 123/275 |
| 2015/0028239 A1 * | 1/2015 | Terakado | ........... | F02M 21/0269 251/129.15 |

FOREIGN PATENT DOCUMENTS

| | | |
|---|---|---|
| JP | 2003254195 A | 9/2003 |
| JP | 2009221936 A | 10/2009 |
| JP | 2010150983 A | 7/2010 |
| JP | 2012047115 A | 3/2012 |
| JP | 2012518120 A | 8/2012 |

OTHER PUBLICATIONS

Written Opinion of the International Searching Authority, App. No. PCT/JP2014/081826, Filed Dec. 2, 2014, dated Mar. 10, 2015, 7 Pages.

* cited by examiner

GAS ENGINE AND ASSEMBLING METHOD FOR GAS ENGINE

TECHNICAL FIELD

This invention relates to a gas engine including a prechamber and an assembling method for a gas engine.

Priority is claimed on Japanese Patent Application No. 2013-259377, filed Dec. 16, 2013, the content of which is incorporated herein by reference.

BACKGROUND ART

As one type of engines, a gas engine is known which is operated by combusting gaseous fuel (fuel gas) such as natural gas, town gas, and the like. This gas engine can achieve high efficiency and high output performance. Therefore, the gas engine is widely used for mainly regular/emergency power generating engines, construction machinery engines, and engines mounted on ships, railway vehicles, and the like.

A gas engine is known in which a cylinder head includes a prechamber for ignition. In this gas engine, an air-fuel mixture obtained by mixing fuel gas and air is supplied to a main combustion chamber inside the cylinder head. In addition, the fuel gas is also supplied to the prechamber. Then, if a piston inside the main combustion chamber moves close to the compression top dead center and the fuel gas inside the main combustion chamber is compressed, the fuel gas supplied into the prechamber is ignited by an ignition plug included in the prechamber. This generates a flame from the prechamber, and the flame is injected into the main combustion chamber through a cap disposed in the prechamber. In this case, the flame ignites the air-fuel mixture inside the main combustion chamber, thereby allowing the gas engine to perform a combustion operation (for example, Patent Document 1).

Here, the prechamber is configured to include the cap that supplies the flame into the main combustion chamber, and a prechamber holder that forms the prechamber into which the fuel gas is supplied.

According to the configuration disclosed in Patent Document 1, the prechamber holder (laser ignition plug) is attached to a cylinder head by screwing a male screw formed on an outer peripheral surface of the prechamber holder into a female screw hole formed in the cylinder head. The cap (prechamber module) and the prechamber holder are attached to each other by screwing a male screw formed on an outer peripheral surface of the cap into a female screw hole of a cap attachment portion formed on the prechamber holder side.

PRIOR ART DOCUMENT

Patent Document

Patent Document 1: Published Japanese Translation No. 2012-518120 of the PCT International Publication

SUMMARY OF INVENTION

Technical Problem

However, the above-described gas engine has the following problem.

Without being limited to the gas engine, various components each have a dimensional tolerance which allows design dimensions to have an error within a certain range when the components are manufactured.

According to the configuration disclosed in Patent Document 1, for example, each dimensional tolerance is also set in an inner diameter of the female screw hole of the cylinder head, an outer diameter of a male screw groove of the outer peripheral surface of the prechamber holder, an outer diameter of the male screw of the cap, and an inner diameter of the female screw hole of the cap attachment portion of the prechamber holder.

Even if the dimension of the respective inner diameters or outer diameters in these sections falls within the dimensional tolerance, for example, if every error of 0.1 mm occurs in the design dimensions, total errors of four components causes a disadvantage in that a position of the cap is misaligned with a nozzle insertion hole of the cylinder head as much as a maximum of 0.4 mm in a radial direction. In this case, at the time of assembly, there is a possibility that the cap may not smoothly fit into the nozzle insertion hole.

If the position of the cap is intended to be more accurately aligned with the cylinder head in the gas engine, it is necessary to narrow a range of the dimensional tolerance of each component. However, narrowing the dimensional tolerance of the component leads to an increased manufacturing cost for the component.

Therefore, in view of the position of the cap being misaligned with the nozzle insertion hole, it is conceivable to dispose a space between the inner peripheral surface of the nozzle insertion hole and the outer peripheral surface of the cap. However, in that case, fuel permeates into the cylinder head through the space. Furthermore, if the permeating fuel which is unburned is discharged as hydrocarbon (HC) together with exhaust gas, this is not environmentally friendly, and a fuel consumption rate per unit time also increases.

This invention aims to provide a gas engine and an assembling method for a gas engine, in which a position of a cap is more accurately aligned with a cylinder head while a cost increase is suppressed, and which can prevent environmental friendliness and the fuel consumption rate from being degraded.

Technical Solution

According to a first aspect of this invention, a gas engine includes a cylinder head in which multiple intake and exhaust ports open toward a main combustion chamber are formed at an interval in a circumferential direction with respect to a central axis. The gas engine further includes a prechamber cap that projects into the main combustion chamber by being inserted into an insertion hole formed in the cylinder head, that internally has a prechamber, and that supplies a flame generated in the prechamber to the main combustion chamber. The gas engine further includes a prechamber holder that is disposed inside the cylinder head so as to hold the prechamber cap. One of the prechamber cap and the prechamber holder includes a concave portion which accommodates an end portion of the other of the prechamber cap and the prechamber holder so as to be relatively movable in a central axis direction and a radial direction when the prechamber cap is inserted into the insertion hole.

According to a second aspect of this invention, in the first aspect, the gas engine may further include a temporary fastening member that holds the end portion accommodated in the concave portion so as to be relatively movable in the radial direction and the central axis direction.

According to a third aspect of this invention, in the gas engine, the temporary fastening member in the second aspect may further include a projection portion which projects inward in the radial direction from an inner peripheral surface of the concave portion, and an insertion-receivable portion which is formed on an outer peripheral surface of the end portion to be accommodated in the concave portion, and into which at least a distal end portion of the projection portion is inserted.

According to a fourth aspect of this invention, in the gas engine, the insertion-receivable portion in the third aspect may extend in a direction along the central axis. The projection portion may extend in the direction along the central axis, and may be inserted into the insertion-receivable portion in a state where the projection portion is movable relative to the insertion-receivable portion in a direction along the central axis.

According to a fifth aspect of this invention, in the gas engine, the temporary fastening member in the second aspect may be a C-shaped snap ring which is mounted on the inner peripheral surface of the concave portion so as to project inward in the radial direction from the inner peripheral surface of the concave portion.

According to a sixth aspect of this invention, in the gas engine, the temporary fastening member in the second aspect may include a guide groove which is formed on the inner peripheral surface of the concave portion, and which extends in the direction along the central axis, a temporary fastening groove which is formed to be continuous with a distal end portion of the guide groove, and which extends in the circumferential direction of the concave portion, and a projection portion which is formed on the outer peripheral surface of the end portion, and which is inserted into the guide groove and the temporary fastening groove.

According to a seventh aspect of this invention, the gas engine in any one aspect of the first to sixth aspects may include a sealing member disposed between a distal end surface of the end portion and a bottom surface of the concave portion.

According to an eighth aspect of this invention, there is provided an assembling method for a gas engine including a cylinder head in which multiple intake and exhaust ports open toward a main combustion chamber are formed at an interval in a circumferential direction with respect to a central axis, a prechamber cap that projects into the main combustion chamber by being inserted into an insertion hole formed in the cylinder head, that internally has a prechamber, and that supplies a flame generated in the prechamber to the main combustion chamber, and a prechamber holder that is disposed inside the cylinder head so as to hold the prechamber cap. The method includes a step of causing a concave portion formed in one of the prechamber cap and the prechamber holder to accommodate an end portion of the other of the prechamber cap and the prechamber holder so as to bring the end portion into a state where the end portion is relatively movable inside the concave portion at least in a radial direction orthogonal to the central axis, and a step of inserting the prechamber cap into the insertion hole formed in the cylinder head and fixing the prechamber holder to the cylinder head in a state where the prechamber cap projects into the main combustion chamber.

Advantageous Effects

According to the above-described gas engine and assembling method for a gas engine, a position of a cap is more accurately aligned with a cylinder head while a cost increase is suppressed. Therefore, it is possible to prevent environmental friendliness and a fuel consumption rate from being degraded.

DESCRIPTION OF EMBODIMENTS

Hereinafter, a gas engine according to an embodiment of this invention will be described with reference to the drawings.

Figure 1:
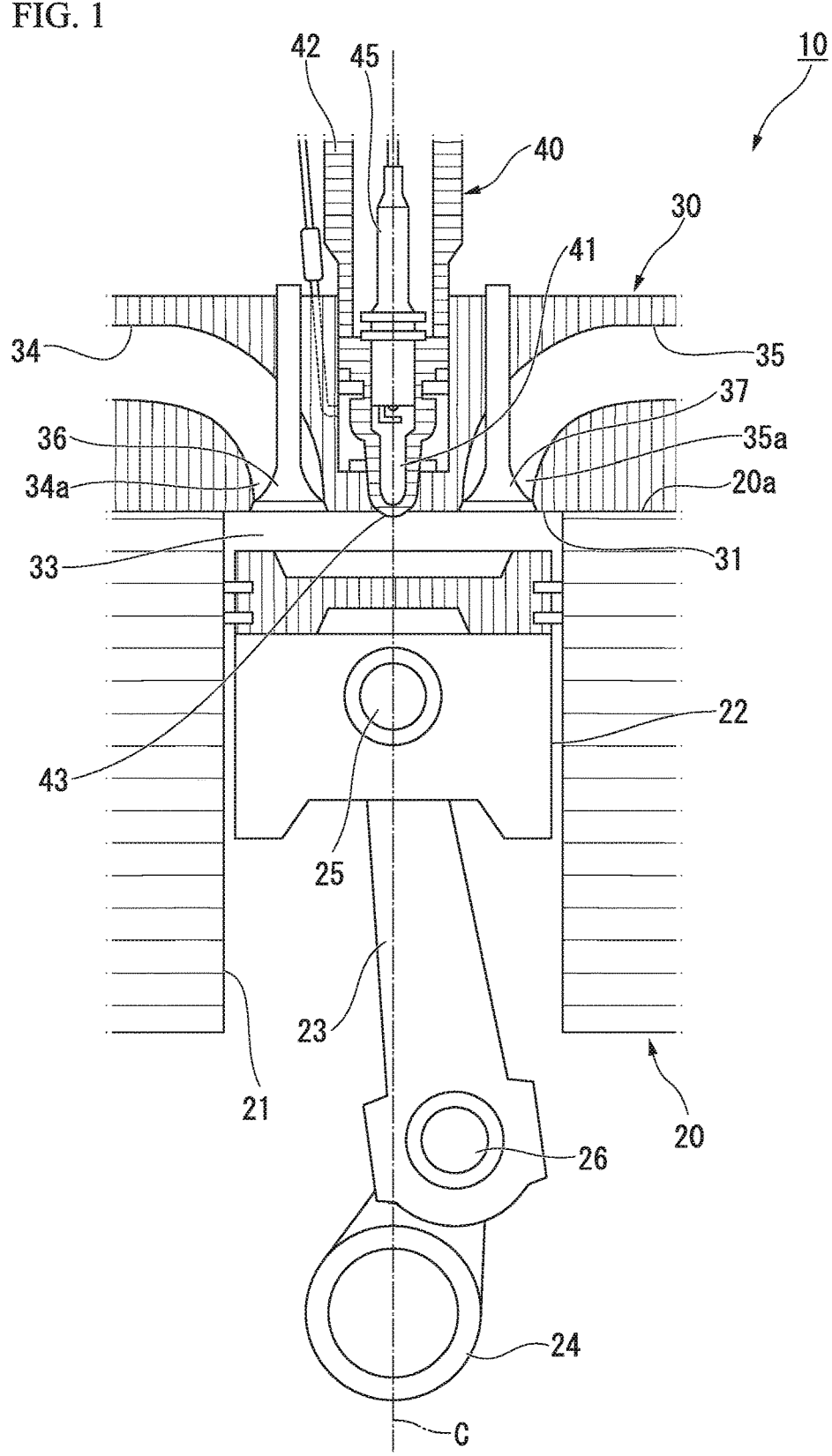
FIG. 1 is a sectional view taken along a cylinder central axis, which shows a configuration around a cylinder head of a gas engine according to an embodiment of this invention.

FIG. 1 is a sectional view taken along a cylinder central axis, which shows a configuration around a cylinder head of a gas engine according to an embodiment of this invention.

As shown in FIG. 1, a gas engine 10 is a prechamber-type gas engine. The gas engine 10 includes at least a cylinder block 20, a cylinder head 30, and a prechamber member 40. The gas engine 10 according to this embodiment is a stationary gas engine used for power generation equipment.

The cylinder block 20 includes a cylinder 21 having a cylindrical shape. The cylinder 21 internally accommodates a piston 22 so that the piston 22 can linearly reciprocate along a central axis C of the cylinder 21. The piston 22 is connected to a crankshaft 24 accommodated inside a crankcase (not shown) via a connecting rod 23. Both end portions of the connecting rod 23 are respectively and pivotally connected to the piston 22 and the crankshaft 24 via pins 25 and 26. In this manner, if the piston 22 linearly moves inside the cylinder 21 in the direction along the central axis C, the movement of the piston 22 is converted into a rotary movement of the crankshaft 24 by the connecting rod 23.

The cylinder head 30 is connected to an end surface 20a on which the cylinder 21 is open in the cylinder block 20. In this manner, the cylinder head 30 blocks the opening of the cylinder 21.

A roof surface 31 having a flat shape, a semi-spherical shape, or a curved surface shape which is orthogonal to the central axis C of the cylinder 21 is formed in a region facing the cylinder 21, on a surface facing the cylinder block 20 side in the cylinder head 30.

A main combustion chamber 33 is divided by the cylinder block 20, the cylinder head 30, and the piston 22.

The cylinder head 30 has an intake port (port) 34 and an exhaust port (port) 35. An end portion 34a of the intake port 34 and an end portion 35a of the exhaust port 35 are respectively open on the roof surface 31, and are arranged so as to face the main combustion chamber 33. The intake port 34 and the exhaust port 35 are concentrically arranged at an interval in a circumferential direction with respect to the central axis C of the cylinder 21.

In the intake port 34, an end portion (not shown) on a side opposite to the main combustion chamber 33 is connected to a mixed gas supply source (not shown). Mixed gas of air and combustion gas is supplied to the intake port 34 from the mixed gas supply source. In the intake port 34, an intake valve 36 is disposed in the end portion 34a on the main combustion chamber 33 side. The intake valve 36 is displaced from a closed position to an open position by a valve drive mechanism (not shown). In this manner, the mixed gas supplied from the mixed gas supply source is supplied to the main combustion chamber 33 through the intake port 34.

In the exhaust port 35, an end portion (not shown) on a side opposite to the main combustion chamber 33 is connected to an exhaust gas flow path (not shown). In the exhaust port 35, an exhaust valve 37 is disposed in the end portion 35a on the main combustion chamber 33 side. The exhaust valve 37 is displaced from a closed position to an open position by a valve drive mechanism (not shown). In this manner, the exhaust gas of the mixed gas combusted in the main combustion chamber 33 is discharged outward via the exhaust gas flow path through the exhaust port 35 from the main combustion chamber 33.

Figure 2:
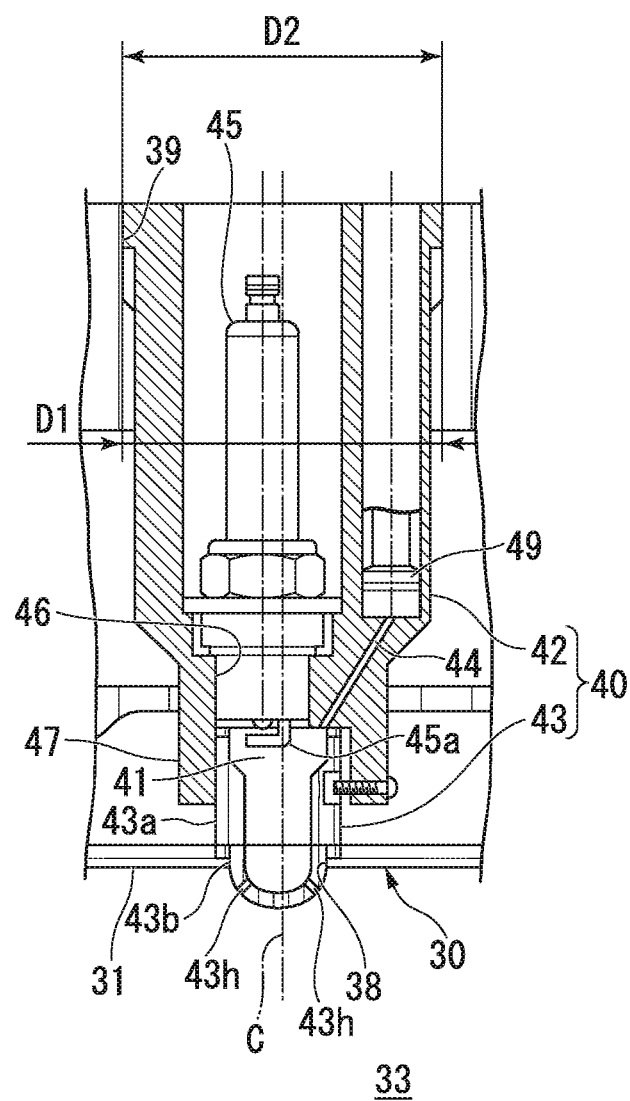
FIG. 2 is a sectional view taken along the cylinder central axis, which shows a configuration around a prechamber of the above-described gas engine.

FIG. 2 is a sectional view taken along the cylinder central axis, which shows a configuration around the prechamber of the gas engine according to this embodiment.

As shown in FIGS. 1 and 2, the prechamber member 40 is disposed in the cylinder head 30. The prechamber member 40 forms the prechamber 41 to which prechamber gas is supplied. The prechamber member 40 is disposed at the center of the roof surface 31, that is, on the extension line of the central axis C of the cylinder 21. The prechamber member 40 is arranged so that the central axis C overlaps the extension line of the central axis C of the cylinder 21. That is, the prechamber member 40 is located at the central portion with respect to the intake port 34 and the exhaust port 35 which are arranged at an interval in the circumferential direction around the central axis C of the cylinder 21.

As shown in FIG. 2, the prechamber member 40 includes a prechamber holder 42 and a prechamber cap 43.

The prechamber holder 42 is disposed by being press-fitted into or being screwed into a prechamber member holding hole 39 formed in the cylinder head 30. The central axis of the prechamber holder 42 is arranged so as to overlap the extension line of the central axis C of the cylinder 21. The prechamber holder 42 includes a gas introduction path 44, a plug holding hole (plug holding portion) 46, and a cap holding portion 47.

The gas introduction path 44 introduces the prechamber gas serving as the fuel gas to the prechamber 41 from the outside.

The plug holding hole 46 is disposed adjacent to the gas introduction path 44. The plug holding hole 46 holds an ignition plug 45 which generates a flame by igniting the prechamber gas inside the prechamber 41.

The cap holding portion 47 holds the prechamber cap 43.

Figure 3:
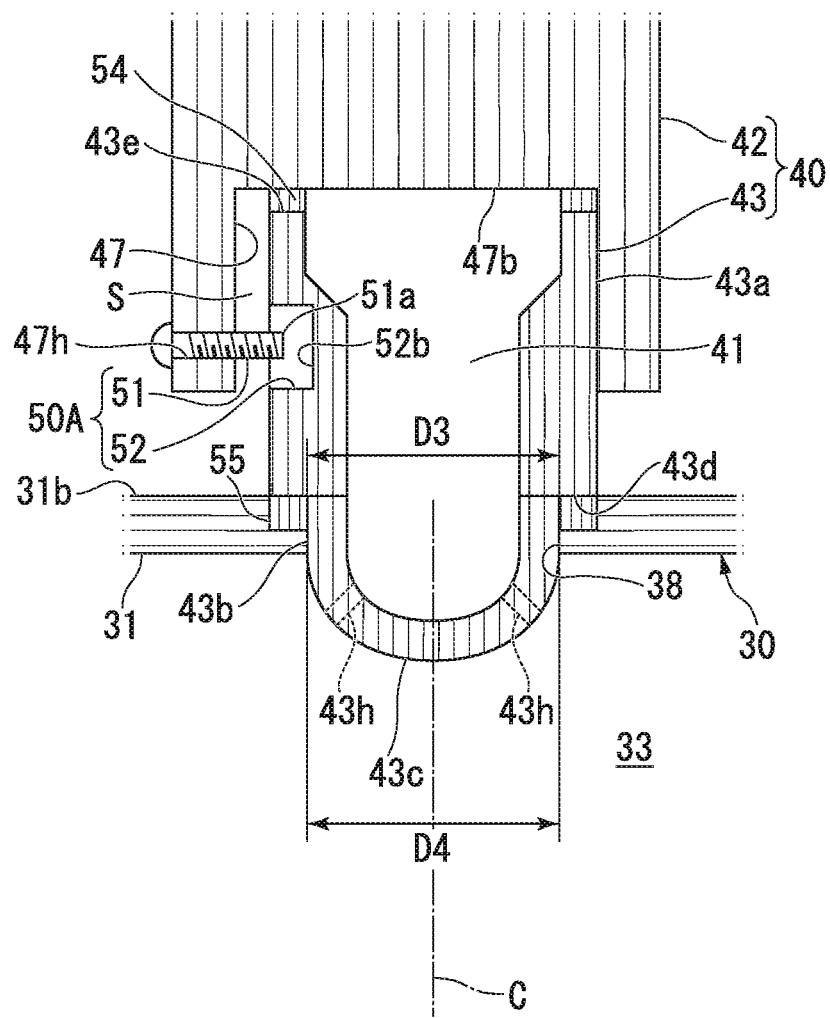
FIG. 3 is a sectional view showing a structure of a prechamber cap attached to a prechamber holder of the above-described gas engine.

FIG. 3 is a sectional view showing a structure of the prechamber cap attached to the prechamber holder according to this embodiment.

As shown in FIGS. 2 and 3, the prechamber cap 43 has a first cylindrical portion (end portion) 43a, a second cylindrical portion 43b, and a distal end portion 43c.

The first cylindrical portion 43a is formed in a cylindrical shape. The first cylindrical portion 43a has an outer diameter smaller than an inner diameter of the cap holding portion 47.

The second cylindrical portion 43b is formed to be continuous with one end of the first cylindrical portion 43a. The second cylindrical portion 43b has an outer diameter smaller than that of the first cylindrical portion 43a.

The distal end portion 43c is formed in a semi-spherical shape which is formed to be continuous with one end of the second cylindrical portion 43b.

The first cylindrical portion (end portion) 43a, the second cylindrical portion 43b, and the distal end portion 43c are formed as described above. In this manner, on the outer peripheral surface of the prechamber cap 43, a stepped portion 43d is formed between the first cylindrical portion 43a and the second cylindrical portion 43b.

The prechamber cap 43 is inserted into a cap insertion hole (insertion hole) 38 in which the second cylindrical portion 43b is formed at the center of the roof surface 31 of the cylinder head 30. The prechamber cap 43 is installed so that the stepped portion 43d collides with a back surface 31b of the roof surface 31. In this state, in the prechamber cap 43, the distal end portion 43c projects into the main combustion chamber 33. The prechamber 41 is formed inside the first cylindrical portion 43a, the second cylindrical portion 43b, and the distal end portion 43c of the prechamber cap 43.

Multiple injection holes 43h are formed in the distal end portion 43c of the prechamber cap 43. The injection holes 43h inject a flame generated by the ignition plug 45 igniting the prechamber gas inside the prechamber 41, into the main combustion chamber 33.

As shown in FIG. 2, a check valve 49 is disposed in the gas introduction path 44 which introduces the prechamber gas serving as the fuel gas to the prechamber 41 from the outside. The prechamber gas is injected into the prechamber 41 via the check valve 49.

The ignition plug 45 ignites and combusts the fuel gas by means of spark discharge. The distal end portion 45a of the ignition plug 45 projects into the prechamber 41. The ignition plug 45 can generate the spark discharge in the distal end portion 45a. The ignition plug 45 generates the spark discharge, thereby generating the flame by igniting and combusting the fuel gas supplied into the prechamber 41 from the gas introduction path 44. The flame generated by the ignition is injected into the main combustion chamber 33 through the injection hole 43h of the prechamber cap 43. The flame combusts the mixed gas supplied into the main combustion chamber 33 through the intake port 34 (refer to FIG. 1). Then, the piston 22 linearly moves inside the cylinder 21 along the central axis C, thereby driving the gas engine 10.

As shown in FIG. 3, in the above-described prechamber member 40, the first cylindrical portion 43a of the prechamber cap 43 is accommodated in the cap holding portion 47. In this manner, the prechamber cap 43 is held by the prechamber holder 42.

A temporary fastening member 50A is disposed in the prechamber member 40. The temporary fastening member 50A includes a pin (projection member) 51 and an insertion groove (insertion-receivable portion) 52.

The pin 51 projects inward in the radial direction from the inner peripheral surface of the cap holding portion 47 of the prechamber holder 42. At least a distal end portion 51a of the pin 51 is inserted into the insertion groove 52. For example, as the pin 51, it is possible to use a screw member which penetrates a penetrating screw hole 47h from the outer peripheral surface side of the cap holding portion 47.

The insertion groove 52 has at least a depth formed in such an extent that the distal end portion 51a of the pin 51 does not interfere with a bottom portion 52b of the insertion groove 52 in a state where the prechamber cap 43 is moved close to the pin 51 side (left side on the paper surface in FIG. 3) inside the cap holding portion 47. The insertion groove 52 is formed in a long hole shape so as to extend in a direction along the central axis C, on the outer peripheral surface of the first cylindrical portion 43a of the prechamber cap 43. The pin 51 in which at least the distal end portion 51a is inserted into the insertion groove 52 is inserted in a state where the pin 51 is movable relative to the insertion groove 52 in the direction along the central axis C.

A sealing member 54 formed of a rubber-based material is attached between a rear end surface (distal end surface of the end portion) 43e of the first cylindrical portion 43a of the prechamber cap 43 and a bottom surface 47b of the cap holding portion 47.

A sealing member 55 formed of a rubber-based material is also attached between the stepped portion 43d of the prechamber cap 43 and the back surface 31b of the roof surface 31 of the cylinder head 30.

Figure 4:
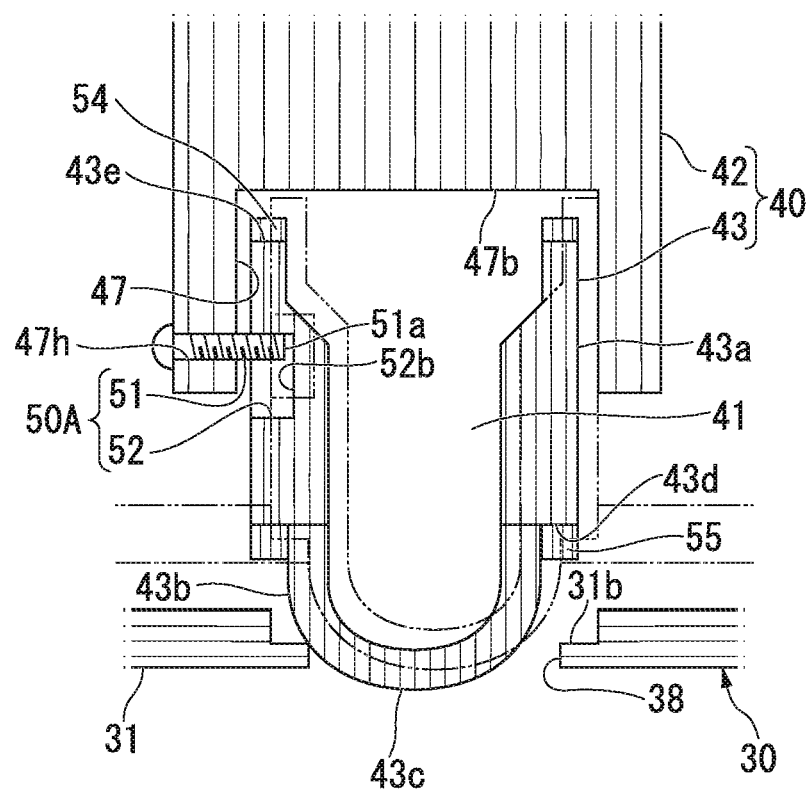
FIG. 4 is a sectional view showing a movement of the prechamber cap when a prechamber member of the above-described gas engine is attached to the cylinder head.

FIG. 4 is a sectional view showing a movement of the prechamber cap 43 when the prechamber member is attached to the cylinder head.

According to the temporary fastening member 50A as described above, in a state of a single body in which the prechamber member 40 is not incorporated in the cylinder head 30 as shown in FIG. 4, the prechamber cap 43 is held in a state where the prechamber cap 43 is movable relative to the prechamber holder 42 inside the cap holding portion 47 in the radial direction and the direction of the central axis C. The relatively movable state continues until the prechamber member 40 is completely incorporated in the cylinder head 30. That is, when the prechamber cap 43 is inserted into the cap insertion hole 38, the prechamber cap 43 is in a state where the prechamber cap 43 is movable relative to the prechamber holder 42 in the radial direction and the central axis direction.

As shown in FIG. 3, in a state where the prechamber member 40 is incorporated in the cylinder head 30, the prechamber cap 43 is interposed between the back surface 31b of the roof surface 31 of the cylinder head 30 and the bottom surface 42b of the prechamber holder 42, via the sealing members 54 and 55. In this state, the movement of the prechamber cap 43 is restricted in the direction along the central axis C. The space S is formed in the radial direction orthogonal to the central axis of the prechamber holder 42, between the cap holding portion 47 and the first cylindrical portion 43a of the prechamber cap 43.

In order to assemble the cylinder head 30 of the gas engine 10 configured as described above, the prechamber member 40 is assembled in advance as follows.

First, the first cylindrical portion 43a of the prechamber cap 43 is accommodated inside the cap holding portion 47 formed in the prechamber holder 42. In this state, the pin 51 is screwed into the penetrating screw hole 47h from the outer peripheral surface of the cap holding portion 47. The distal end portion Ma is inserted into the insertion groove 52 formed on the outer peripheral surface of the cap holding portion 47. In this manner, the prechamber cap 43 is in a state where the prechamber cap 43 is relatively movable inside the cap holding portion 47 in the direction along the central axis C and the radial direction orthogonal to the central axis C.

Thereafter, in a state where the prechamber cap 43 of the assembled prechamber member 40 is inserted into the cap insertion hole 38 formed in the cylinder head 30 and is caused to project into the main combustion chamber 33, the prechamber holder 42 is fixed to the cylinder head 30.

When the prechamber cap 43 is inserted into the cap insertion hole 38, the prechamber cap 43 is movable inside the cap holding portion 47 in the radial direction. Therefore, as shown by a two-dot chain line in FIG. 4, the prechamber cap 43 moves in the radial direction while being aligned with the position of the cap insertion hole 38, and is inserted into the cap insertion hole 38.

Therefore, according to the gas engine in the above-described embodiment, the outer diameter of the first cylindrical portion 43a of the prechamber cap 43 is set to be smaller than the inner diameter of the cap holding portion 47. Accordingly, the prechamber cap 43 is relatively movable inside the cap holding portion 47 in the radial direction. In this manner, when the gas engine 10 is assembled, the prechamber cap 43 moves in the radial direction while being aligned with the position of the cap insertion hole 38. Accordingly, the prechamber cap 43 can be inserted into the cap insertion hole 38. As a result, even if there is a processing error in an outer diameter D1 (refer to FIG. 2) of the prechamber holder 42, an inner diameter D2 (refer to FIG. 2) of the prechamber member holding hole 39, an outer diameter D3 (refer to FIG. 3) of the prechamber cap 43, and an inner diameter D4 (refer to FIG. 3) of the cap holding portion 47, the prechamber cap 43 can be accurately installed in the cylinder head 30.

Furthermore, it is not necessary to particularly improve accuracy in processing the prechamber holder 42, the prechamber member holding hole 39, the prechamber cap 43, and the cap holding portion 47. Accordingly, it is possible to suppress a cost increase.

In addition, it is not necessary to maintain the space between the inner peripheral surface of the cap insertion hole 38 and the outer peripheral surface of the prechamber cap 43. Therefore, it is possible to prevent environmental friendliness and a fuel consumption rate from being degraded without causing the unburned fuel to leak from the space.

(Another Embodiment)

The gas engine according to this invention is not limited to the above-described embodiment, and includes those which have various modifications added to the above-described embodiment within the scope not departing from the gist of this invention. That is, a specific shape or configuration described in the embodiment is only an example, and can be appropriately modified. Various modified examples are conceivable in the technical scope. Hereinafter, the modified examples of the above-described embodiment will be described with reference to FIGS. 5A, 5B, 6A, 6B, and 7. In the modified examples in FIGS. 5A, 5B, 6A, 6B, and 7, the same reference numerals will be given to elements which are the same as those in the above-described embodiment, and a repeated description will be omitted.

For example, in the above-described embodiment, the temporary fastening member 50A is configured to include the pin 51 and the insertion groove 52, but the invention is not limited to this configuration. The configuration of the temporary fastening member is not limited in any way as long as the prechamber cap 43 can be held in a state of a single body where the prechamber member 40 is not incorporated in the cylinder head 30, and in a state where the prechamber cap 43 is movable relative to the prechamber holder 42 inside the cap holding portion 47 at least in the radial direction.

Figure 5A:
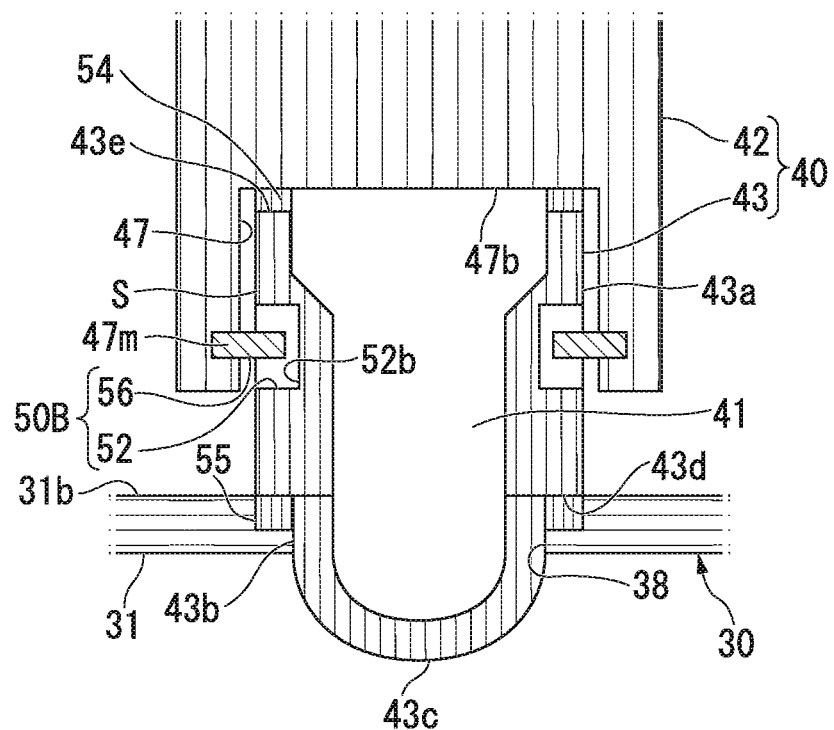
FIG. 5A is a sectional view showing a modified example of a structure of a prechamber cap attached to a prechamber holder according to the embodiment of this invention.
Figure 5B:
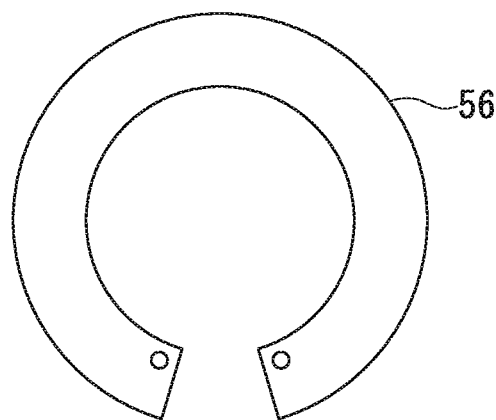
FIG. 5B is a view showing a modified example of a structure of the prechamber cap attached to the prechamber holder according to the embodiment of this invention, and is a plan view of a snap ring.

For example, as shown in FIGS. 5A and 5B, a configuration may be adopted in which a temporary fastening member 50B projects inward in the radial direction from the inner peripheral surface of the cap holding portion 47. For example, the temporary fastening member 50B may include a snap ring 56 and the insertion groove 52. For example, the snap ring 56 is formed in a C-shape, and is mounted on the inner peripheral surface of the cap holding portion 47. The insertion groove 52 is formed to be continuous with the outer peripheral surface of the prechamber cap 43 in the circumferential direction. The snap ring 56 is fitted into a ring groove 47m formed to be continuous with the inner peripheral surface of the cap holding portion 47 in the circumferential direction.

In this case, the snap ring 56 and the insertion groove 52 may be disposed so that both of these can be held in a state where the prechamber cap 43 is relatively movable inside the cap holding portion 47 in the direction of the central axis C (refer to FIG. 1).

Figure 6A:
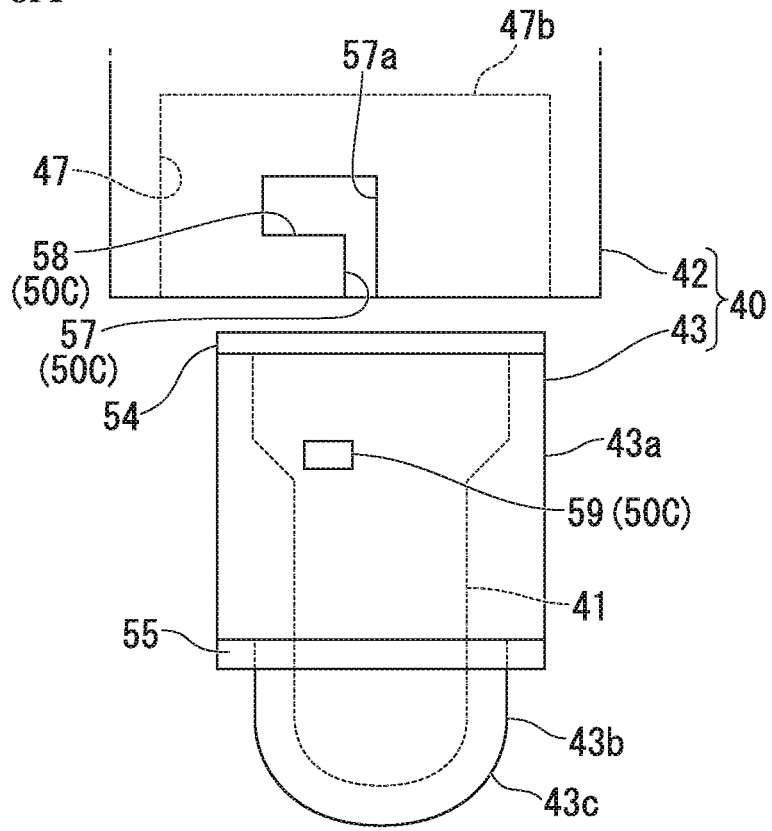
FIG. 6A is a view showing another modified example of a structure of the prechamber cap attached to the prechamber holder according to the embodiment of this invention, and is a view showing the external appearance of a main portion of the prechamber cap and the prechamber holder.
Figure 6B:
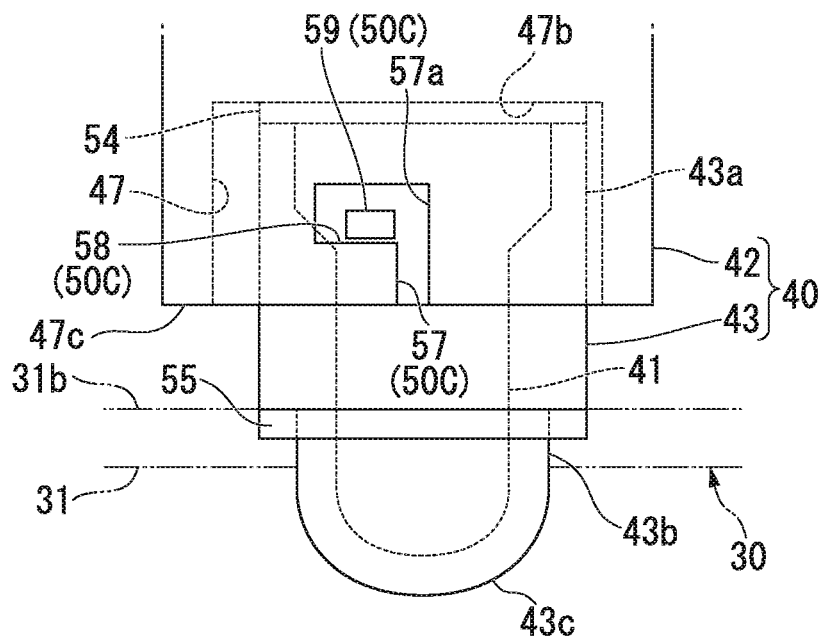
FIG. 6B is a view showing another modified example of a structure of the prechamber cap attached to the prechamber holder according to the embodiment of this invention, and is a view showing the external appearance in a state where the prechamber cap is attached to the prechamber holder.

In addition, as shown in FIGS. 6A and 6B, a temporary fastening member 50C may include a guide groove 57, a temporary fastening groove 58, and a projection portion 59. Here, the guide groove 57 is formed on the inner peripheral surface of the cap holding portion 47, and extends in the direction of the central axis C (refer to FIG. 1) from the distal end portion 47c of the cap holding portion 47. The temporary fastening groove 58 is formed to be continuous from a distal end portion 57a of the guide groove 57, and extends in the circumferential direction of the cap holding portion 47. The projection portion 59 is formed on the outer peripheral surface of the first cylindrical portion 43a of the prechamber cap 43, and is inserted into the guide groove 57 and the temporary fastening groove 58.

As shown in FIG. 6B, the temporary fastening groove 58 is formed to have a groove width which can hold the prechamber cap 43 in a state where the projection portion 59 is inserted into the temporary fastening groove 58, and in a state where the prechamber cap 43 is relatively movable inside the cap holding portion 47 in the direction of the central axis C.

Figure 7:
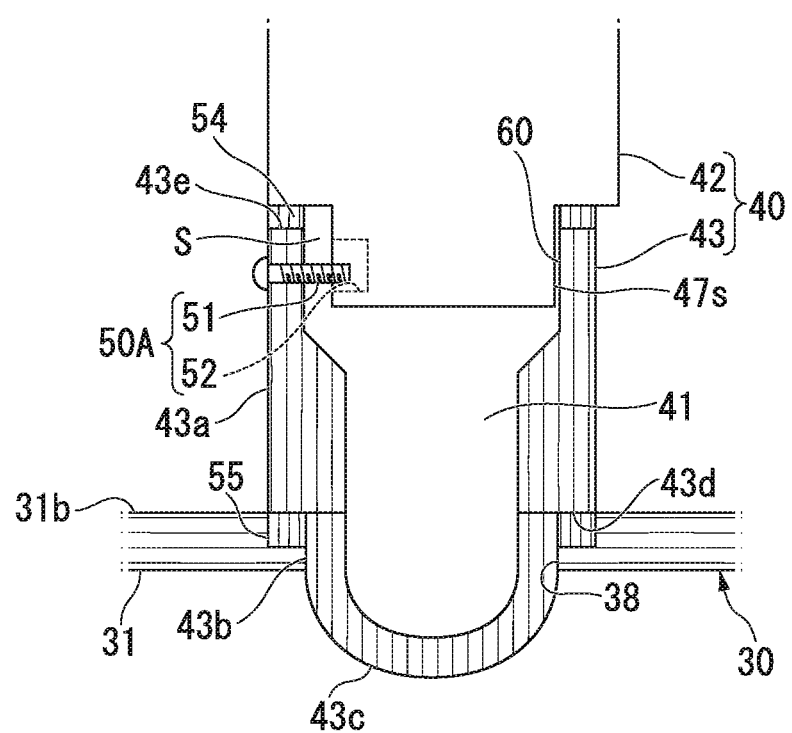
FIG. 7 is a sectional view showing yet another modified example of a structure of the prechamber cap attached to the prechamber holder according to the embodiment of this invention.

Furthermore, in the above-described embodiment, the first cylindrical portion 43a of the prechamber cap 43 is accommodated in the cap holding portion 47, thereby causing the prechamber holder 42 to hold the prechamber cap 43, but the invention is not limited thereto. For example, as shown in FIG. 7, the prechamber holder 42 may hold the prechamber cap 43 by forming a concave portion 60 on the prechamber cap 43 side and accommodating an end portion 47s of the cap holding portion 47 inside the concave portion 60.

In addition, the gas engine 10 according to the above-described embodiment may adopt any other configuration as a configuration of each unit other than the holding structure of the prechamber cap 43 with respect to the prechamber holder 42 in the prechamber member 40.

INDUSTRIAL APPLICABILITY

This invention relates to a gas engine. According to this invention, a position of a cap is more accurately aligned with a cylinder head while a cost increase is suppressed. Therefore, it is possible to prevent environmental friendliness and a fuel consumption rate from being degraded.

REFERENCE SIGNS LIST

10 GAS ENGINE
20 CYLINDER BLOCK
30 CYLINDER HEAD
31 ROOF SURFACE
31b BACK SURFACE
33 MAIN COMBUSTION CHAMBER
34 INTAKE PORT (PORT)
35 EXHAUST PORT (PORT)
38 CAP INSERTION HOLE (INSERTION HOLE)
39 PRECHAMBER MEMBER HOLDING HOLE
40 PRECHAMBER MEMBER
41 PRECHAMBER
42 PRECHAMBER HOLDER
42b BOTTOM SURFACE
43 PRECHAMBER CAP
43a FIRST CYLINDRICAL PORTION (END PORTION)
43b SECOND CYLINDRICAL PORTION
43c DISTAL END PORTION
43d STEPPED PORTION
43e REAR END SURFACE
43h INJECTION HOLE
47 CAP HOLDING PORTION (CONCAVE PORTION)
47b BOTTOM SURFACE
50A, 50B, 50C TEMPORARY FASTENING MEMBER
51 PIN (PROJECTION MEMBER)
51a DISTAL END PORTION
52 INSERTION GROOVE (INSERTION-RECEIVABLE PORTION)
52b BOTTOM PORTION
54 SEALING MEMBER
56 SNAP RING
57 GUIDE GROOVE
57a DISTAL END PORTION
58 TEMPORARY FASTENING GROOVE
59 PROJECTION PORTION
60 CONCAVE PORTION
C CENTRAL AXIS
S SPACE

The invention claimed is:
1. A gas engine comprising:
a cylinder head in which multiple intake and exhaust ports open toward a main combustion chamber and are formed at an interval in a circumferential direction with respect to a central axis; and
a prechamber member comprising:
a prechamber cap that projects into the main combustion chamber by being inserted into an insertion hole formed in the cylinder head, wherein the prechamber cap internally has a prechamber and is to supply a flame to be generated in the prechamber to the main combustion chamber; and
a prechamber holder disposed inside the cylinder head to hold the prechamber cap, wherein one of the prechamber cap and the prechamber holder includes a concave portion to accommodate an end portion of the other of the prechamber cap and the prechamber holder, an outer diameter of the end portion is smaller than an inner diameter of the concave portion, and a space is formed between the concave portion and the end portion in a radial direction orthogonal to the central axis;

and a fastening member to hold the end portion accommodated in the concave portion to allow the end portion to move in the radial direction if the prechamber member is not incorporated in the cylinder head.

2. The gas engine according to claim 1, wherein the fastening member holds the end portion accommodated in the concave portion so as to allow the end portion to move in the radial direction and the central axis direction.

3. The gas engine according to claim 1, wherein the fastening member includes:

a projection portion which projects inward in the radial direction from an inner peripheral surface of the concave portion, and an insertion-receivable portion which is formed on an outer peripheral surface of the end portion to be accommodated in the concave portion, and into which at least a distal end portion of the projection portion is inserted.

4. The gas engine according to claim 3, wherein the insertion-receivable portion extends in a direction along the central axis, and the projection portion is to be inserted into the insertion-receivable portion in a state where the projection portion is movable relative to the insertion-receivable portion in the direction along the central axis.

5. The gas engine according to claim 1, wherein the fastening member is a C-shaped snap ring which is to be mounted on the inner peripheral surface of the concave portion so as to project inward in the radial direction from the inner peripheral surface of the concave portion.

6. The gas engine according to claim 2, wherein the fastening member includes a projection portion, formed on the outer peripheral surface of the end portion, which is configured to be inserted into a guide groove and a fastening groove;

wherein, the guide groove, which is formed on the inner peripheral surface of the concave portion, extends in the direction along the central axis, and the fastening groove, which is formed to be continuous with a distal end portion of the guide groove, extends in the circumferential direction of the concave portion.

7. The gas engine according to claim 1, further comprising:

a sealing member disposed between a distal end surface of the end portion and a bottom surface of the concave portion.

8. An assembling method for a gas engine including a cylinder head in which multiple intake and exhaust ports open toward a main combustion chamber are formed at an interval in a circumferential direction with respect to a central axis, and a prechamber member comprising a prechamber cap that projects into the main combustion chamber by being inserted into an insertion hole formed in the cylinder head that internally has a prechamber and that supplies a flame generated in the prechamber to the main combustion chamber, and a prechamber holder that is disposed inside the cylinder head so as to hold the prechamber cap, the method comprising:

causing a concave portion formed in one of the prechamber cap and the prechamber holder to accommodate an end portion of the other of the prechamber cap and the prechamber holder, the end portion having an outer diameter smaller than an inner diameter of the concave portion, with a space being formed between the concave portion and the end portion in a radial direction orthogonal to the central axis, holding the end portion accommodated in the concave portion so as to allow the end portion to move in the radial direction;

inserting the prechamber cap into the insertion hole; and fixing the prechamber holder to the cylinder head in a state where the prechamber cap projects into the main combustion chamber.

9. The assembling method according to claim 8 wherein during the holding, the end portion accommodated in the concave portion is held so as to be movable in the central axis direction.

* * * * *